United States Patent [19]

Hehl

[11] Patent Number: 4,573,901

[45] Date of Patent: Mar. 4, 1986

[54] DIE CARRIER MEMBER FOR DIE CLOSING UNIT OF INJECTION MOLDING MACHINE

[76] Inventor: Karl Hehl, Arthur-Hehl-Strasse 32, 7298 Lossburg 1, Fed. Rep. of Germany

[21] Appl. No.: 694,757

[22] Filed: Jan. 25, 1985

[30] Foreign Application Priority Data

Jan. 25, 1984 [DE] Fed. Rep. of Germany ....... 3402404
Jan. 25, 1984 [DE] Fed. Rep. of Germany ....... 3402405

[51] Int. Cl.$^4$ .............................................. B29F 1/06
[52] U.S. Cl. ................................... 425/451; 425/453; 425/450.1
[58] Field of Search ............... 425/574, 589, 590, 595, 425/450.1, 451, 451.2, 451.9, 453

[56] References Cited

U.S. PATENT DOCUMENTS

| 4,080,144 | 3/1978 | Hehl | 425/451.2 X |
| 4,315,728 | 2/1982 | Hehl | 425/450.1 X |
| 4,453,912 | 6/1984 | Hehl | 425/451 X |
| 4,530,655 | 7/1985 | Hehl | 425/451 X |
| 4,533,313 | 8/1985 | Poncet | 425/406 X |

*Primary Examiner*—J. Howard Flint, Jr.
*Attorney, Agent, or Firm*—Joseph A. Geiger

[57] ABSTRACT

A cast iron die carrier member for the die closing unit of an injection molding machine having a machined die mounting face which is interrupted by a pattern of shallow face grooves on the surface of which the casting skin of higher resistance and lower elongation is retained, in order to stiffen the die carrier member against bending and distortion under an elevated die closing pressure. The die carrier member also has axially extended, vertically braced supporting flanges reinforcing the cantilever-type clamping connection between the member and the guide rails of the machine base to further stiffen the die carrier member against bending and to thereby reduce the long-term wear of the guide surfaces of the die closing unit.

14 Claims, 5 Drawing Figures

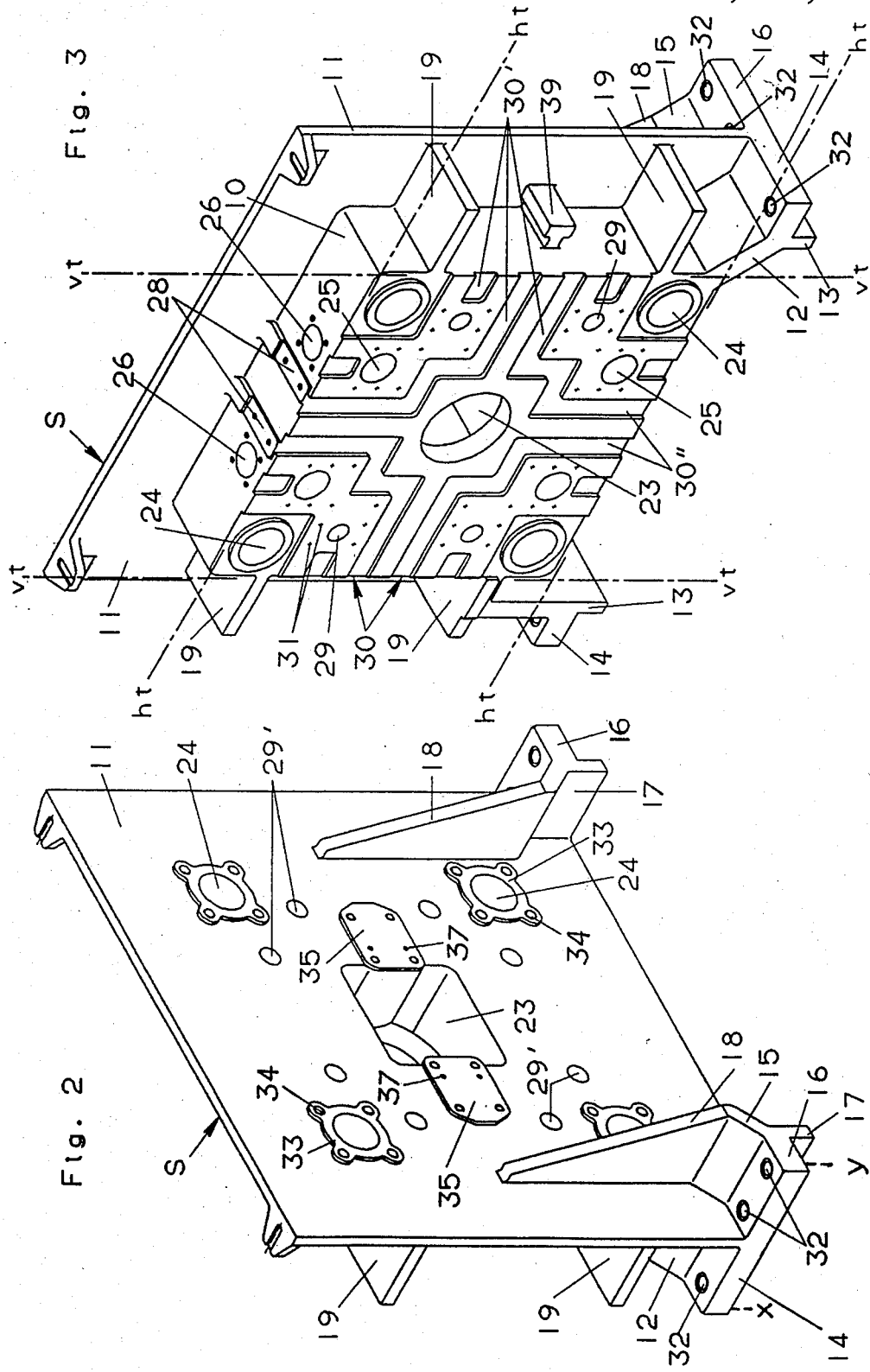

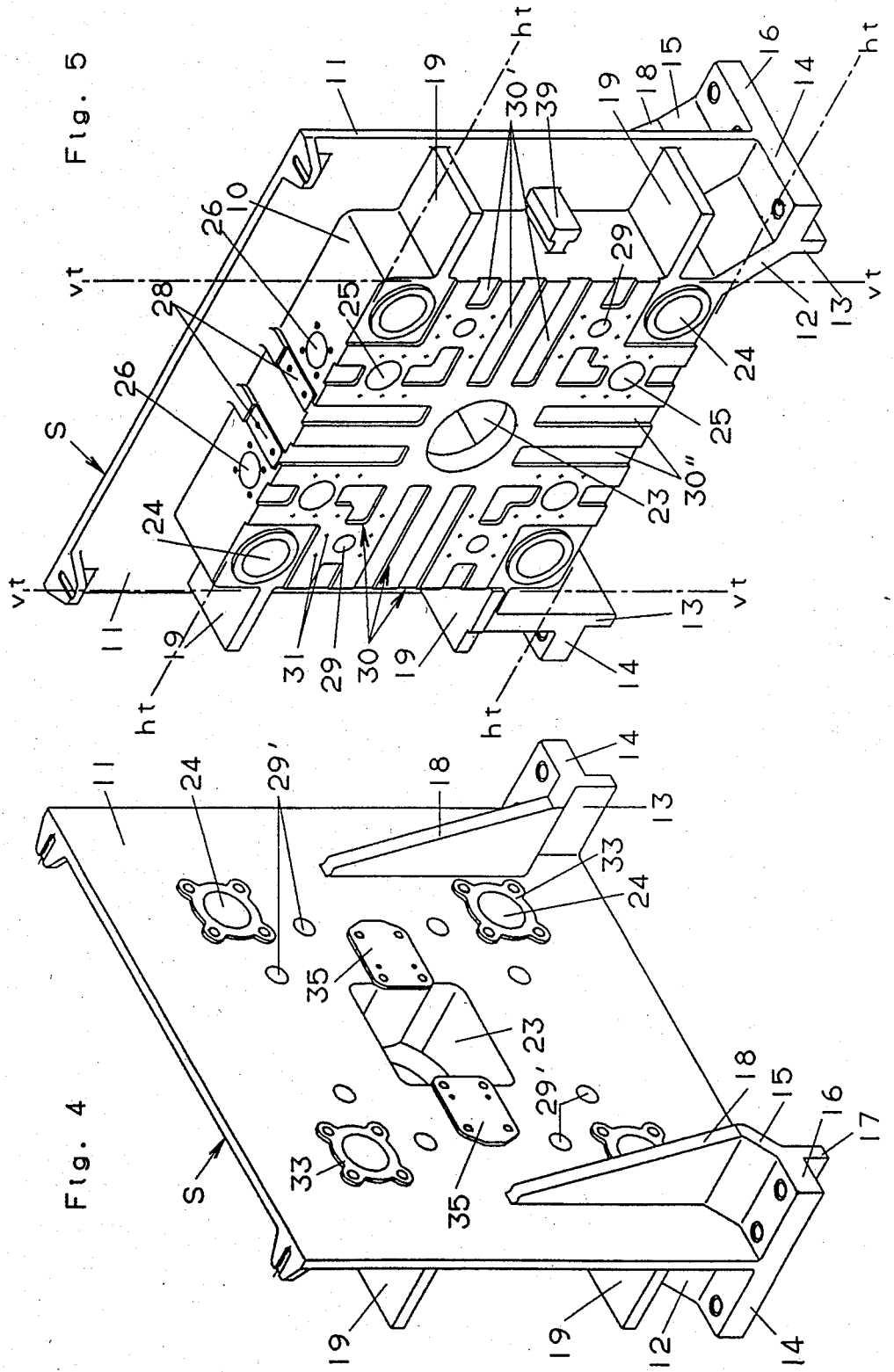

DIE CARRIER MEMBER FOR DIE CLOSING UNIT OF INJECTION MOLDING MACHINE

BACKGROUND OF THE INVENTION

1. Field of the Invention

The present invention relates to injection molding machines and, more particularly, to the die closing unit of a plastics injection molding machine and to the structure of cast iron die carrier plates which, as part of the die closing unit, serve to support the two die halves of the injection molding die.

2. Description of the Prior Art

The injection molding of plastic precision parts, such as parts for precision instruments and the like, requires not only a high degree of accuracy in the guidance and alignment of the two die halves, but also an elevated die closing pressure during the injection of the part. In order to minimize weight deviations—a reflection of dimensional deviations—of the injection-molded parts over an extended period of time, it is also important that the wear on those surfaces which provide the support and guidance of the movable die half be kept to an absolute minimum.

Initially, the degree of accuracy achieved is a function of the accuracy with which the stationary and movable die carrier members of the die closing unit are machined and aligned on the machine base and, of course, also a function of the dimensional accuracy of the injection molding die itself.

A crucial factor in the maintenance of the initial accuracy of guidance and alignment and in the minimization of long-term wear, under the rhythmically applied high stress of the die closing pressure, in alternation with the die opening and closing movements, is the rigidity of the die closing unit. This rigidity is to a certain degree influenced by the rigidity of the machine base of the injection molding machine and by the manner in which the die closing unit is attached to the machine base.

It has been found that a relatively rigid die closing unit is obtainable with a structural configuration in which the movable die carrier member is supported and guided on four parallel horizontal tie rods which extend between the stationary die carrier member and a second stationary member in the form of a cylinder head plate, whereby the movable die carrier member is pushed closed by means of a single hydraulic cylinder assembly which is arranged in the center axis of the die closing unit and attached to the axially outer side of the cylinder head plate.

The result is a skeleton structure in which the four tie rods form longitudinal members at the four corners of a square prism, and the two stationary members serve as transverse connecting members at the two extremities of the prism. This type of die closing unit is known from the prior art and disclosed, for example, in German Patent No. 25 44 537 and in the corresponding U.S. Pat. No. 4,080,144.

Additional torsional stiffness is provided by a box-like machine base which has two parallel guide rails welded to the upper edges of its longitudinal side walls. The stationary die carrier member and the stationary cylinder head plate engage horizontal and vertical faces of the guide rails with angular flange formations. The two guide rails thus assure the precise axial alignment of the two stationary members. The two guide rails may also be used to provide additional support and guidance for the movable die carrier member, as suggested in the German Patent No. 31 40 740 and in the corresponding U.S. Pat. No. 4,453,912.

It has also been found that, even with four heavy tie rods, the elevated die closing pressure produces a minute relative separation of the two stationary members of the die closing unit, as the tie rods undergo elongation. In order to maintain a precise parallel alignment between the stationary and movable die carrier members, it has therefore also been suggested to clamp only the stationary die carrier member to the guide rails of the machine base and to arrange for the stationary cylinder head plate to be free to execute small longitudinal displacements on the guide rails. Such an arrangement is disclosed in my copending U.S. patent application Ser. No. 443,644 filed Nov. 22, 1982, now U.S. Pat. No. 4,530,655.

Careful observations and measurements made over an extended period of time on highly stressed die closing units have now revealed that, even with all the measures heretofore proposed for the purpose of eliminating any possible alignment distortions of the die carrier members, minute, not readily measurable rhythmic distortions do take place and that, although no wear takes place on the die closing unit and no weight deviations of the injection-molded parts are registered for a considerable length of time, such wear does takes place over the long run, and it appears to increase in a geometric progression.

Extensive experiments and tests have lead to the conclusion that this problem is connected with the stationary die carrier member which appears to undergo minute distortions, despite the fact that it has a heavy block-shaped body and is firmly bolted to the guide rails of the machine base.

The two die carrier members of this type of die closing unit have oppositely facing planar die mounting faces which extend over an area which is at least as large as the square (or rectangle) enclosed by four tangents to the most proximate points of each pair tie rods, and preferably over an area which is as large as the square (or rectangle) enclosed by four tangents to the most distant points of each pair of tie rods.

These die carrier members are normally of cast iron, at least the stationary die carrier member having interior cavities between parallel walls on its inner and outer axial sides, for the purpose of reducing its weight. The casting operation for these members requires a relatively high casting temperature which, on the other hand, must be kept low enough to minimize such undesirable side effects as gas adsorption, oxidation, cavity formation, grain coarsening and the like, including chemical reactions with the mold materials in the walls of the mold.

The rate of solidification and cooling within the die carrier casting differs in various regions and zones of the latter, depending on the wall thickness and on the rate at which the casting form removes heat from the casting. As a result, the molecular structure of the solidified cast iron is affected differently in different zones of the casting, and internal stresses remain in the cooled-off casting.

These molecular differences reflect themselves in nonuniform mechanical characteristics of the metal and, particularly, in an increased stress resistance and a reduced elongation of the surface zones of the casting —commonly known as the "casting skin"—as compared to the main body of the casting.

Following the cooling-off process, such a casting may be outwardly stable, inspite of the fact that its surface zones have solidified and hardened earlier than its interior zones. Thanks to the coherence and the high resistance of the casting skin, the latter may contain the interior stresses to such an extent that, initially at least, no noticeable distortions of shape occur in the casting. Problems tend to arise, however, when, in the course of machining operations on the die carrier casting, the casting skin is removed. The extent of which such distortion problems are encountered is related to the size and degree of continuity of the surface area over which the casting skin has been removed.

On the other hand, the removal of large portions of the casting skin through machining also results is a considerable reduction in the stiffness of the casting, i.e. in the mechanical resistance of the casting against deformation, especially against bending. This is due to the fact that the casting skin offers a higher stress resistance and less elongation than the remainder of the casting and the fact that the tensile and compressive stresses created by a bending load are highest in those regions of the casting which are farthest from the center—more precisely, the neutral bending axis—the casting.

SUMMARY OF THE INVENTION

Underlying the present invention is the primary objective of suggesting an improved structure for a die carrier member or die carrier plate of the type which has been described above which, while maintaining all the features which are important for efficient manufacturing operations, offers a higher structural rigidity and therefore a greater resistance to deflection and distortion under elevated die closing pressures, in order to reduce operational wear on the guide surfaces of the die closing unit over the long run.

The present invention proposes to attain this objective by suggesting a die carrier member of cast iron, preferably of spherolitic cast iron, which has a block-shaped die carrier body and a die mounting face on its axially inner side which extends between the tie rod bores substantially to the edges of a rectangle defined by two horizontal and two vertical rectangle sides and which encloses the four tie rod bores in its corner portions, whereby the die mounting face is traversed by a pattern of shallow face grooves, the surfaces of which remain covered by the casting skin.

This improved die carrier structure has the advantage of preserving the superior bending resistance and reduced elongation characteristics of the casting skin on a substantial portion of the die mounting face of the die carrier plate, at a level which is only slightly below the surface of the die mounting face. The surface area covered by the face groove pattern covers preferable approximately twenty-five percent of the total surface area of the die mounting face.

As part of this improvement, the invention further suggests that the pattern of face grooves include a set of parallel horizontal groove portions and a set of parallel vertical groove portions, with all the groove portions so arranged that a substantially continuous machined face portion remains around each of the tie rod bores as well as the other axial bores of the die carrier member.

The face grooves are preferably so arranged that their radially outer ends are open at the four rectangle sides and their radially inner ends are either merging with perpendicularly oriented groove portions, or simply stop short of the central opening of the die carrier member. The layout of the groove pattern is preferably symmetrical with respect to at least a vertical longitudinal center plane of the die closing unit.

In addition to having a machined die mounting face on the axially inner side of the die carrier body which is intersected by a pattern of shallow face grooves, the stationary die carrier member of the invention also has several smaller machined mounting faces in a common outer face plane, on the axially outer side of the die carrier body, and an outwardly rectangular, collar-like transverse shield surrounding the die carrier body on its axially outer side.

The transverse shield is preferably in alignment with the outer wall of the die carrier body and recessed from its outer face plane by approximately the same amount as the face grooves are recessed from the inner face plane of the die mounting face. The transverse shield and the aligned outer side of the die carrier body retain their casting skin.

The movable die carrier member, while shaped like two axially spaced plates which are linked by four longitudinal ribs, has its die carrier plate structured in a manner which is similar to the structure of the stationary die carrier member, viz. a die mounting face of substantially the same rectangular outline as the die mounting face of the stationary die carrier member and a pattern of shallow face grooves in the machined surface of the die mounting face, where the casting skin is retained. The movable die carrier member does not have a transverse shield.

The present invention also suggests a new manufacturing method for the die carrier member of the invention, whereby a casting is produced of a shape which corresponds to the shape of the finished die carrier member with an additional material thickness which protrudes over the inner and outer face planes of the die carrier body in the areas between the face grooves, as well as in the areas of the outer abutment faces and mounting faces, whereupon the surface of the casting is sand-blasted and covered with a layer of plastic material and the casting is machined on a machining center, where the material thicknesses protruding over the two face planes are removed in a high-speed milling operation.

A further inventive measure aimed at the achievement of an improved resistance to deflection and distortion of the stationary die carrier member involves the reinforcement of the clamping connection between the stationary die carrier member and the two guide rails of the machine base. Specifically, the invention suggests an extension of the horizontal supporting faces with which the die carrier member engages the upper sides of the guide rails to a length which is greater than one-half of the vertical distance of the longitudinal center axis of the die closing unit from the supporting surfaces of the guide rails.

This extension of the supporting faces of the stationary die carrier member is preferably obtained by extending the horizontal flange portions of the die carrier member axially outwardly beyond the outer face plane of the die carrier body. The extended horizontal flange portions are preferably braced against the die carrier body by means of adjoining extended vertical flange portions and by diagonal braces and vertical reinforcing ribs on the outer side of the die carrier body.

In view of the fact that the stationary cylinder head plate is not bolted to the guide rails and the four tie rods offer limited resistance against bending, the clamping connection between the stationary die carrier member and the guide rails of the machine base is a cantilever-type connection. The proposed axial extension and resulting strengthening of this connection offers the advantage of employing the rigidity of the machine base to strengthen and brace the stationary die carrier member against deflections and distortions resulting from the elevated die closing pressure.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows:

FIGS. 2 and 3 show the stationary die carrier member of the die closing unit of FIG. 1 in two enlarged perspective views, as seen from the outer and inner sides, respectively, of the die carrier member;

FIGS. 4 and 5 show a modified version of a die carrier member in views which correspond to those of FIGS. 2 and 3.

DESCRIPTION OF THE PREFERRED EMBODIMENT

Figure 1:
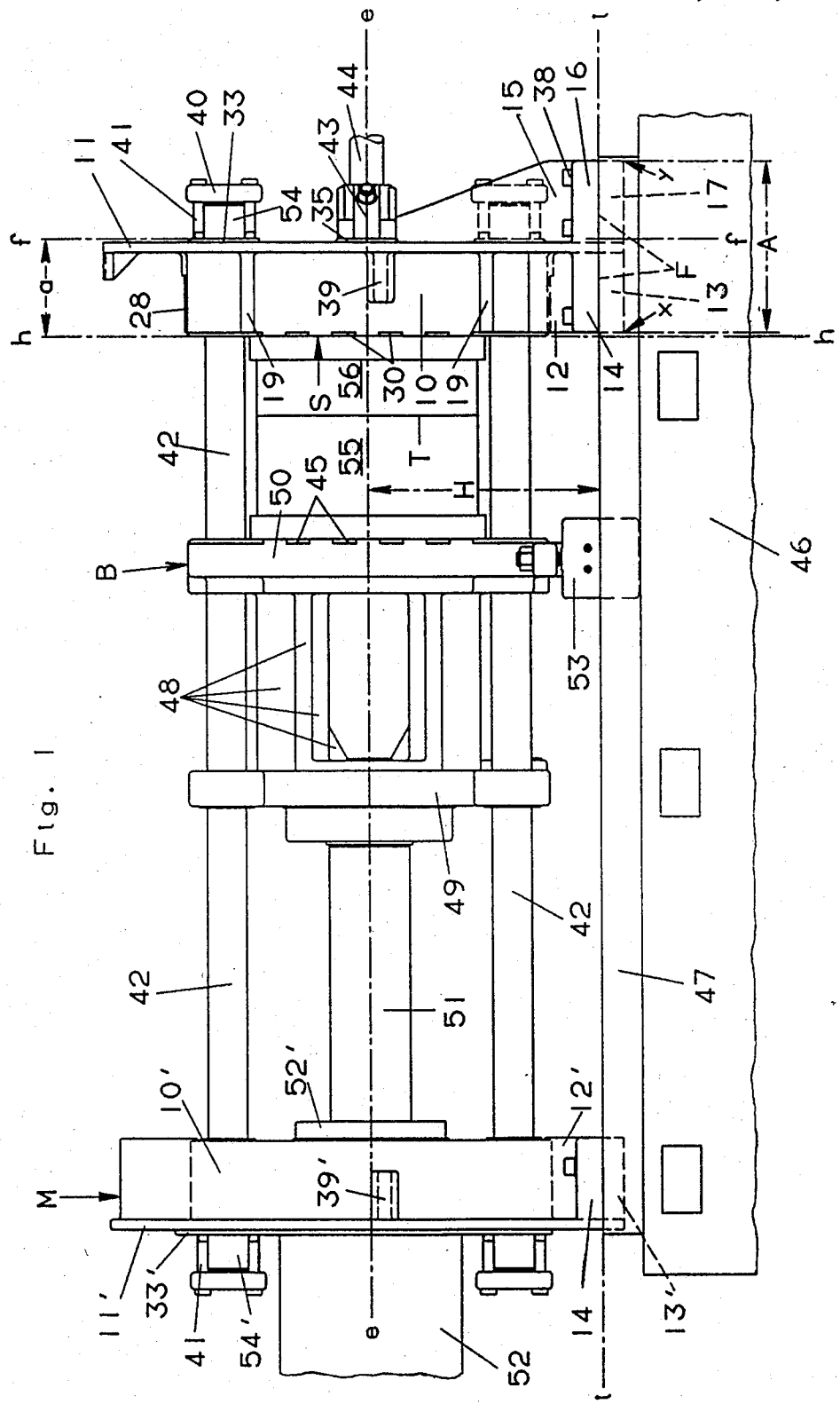
FIG. 1 shows, in an elevational view, a die closing unit as part of a plastics injection molding machine with a framelike movable die carrier member and a plate-shaped stationary die carrier member.

In FIG. 1 is illustrated a die closing unit of an injection molding machine which is mounted on a machine base 46. The die closing unit is of the push-type, having its movable die carrier member guided for opening and closing movements along four parallel tie rods 42.

The four tie rods 42 have their extremities attached to a stationary die carrier member S and a likewise stationary cylinder head plate M. The latter carries a hydraulic actuator assembly 52 in the longitudinal center axis e—e of the die closing unit. The piston rod 51 of the hydraulic actuator assembly 52, reaching through the cylinder cover 52', transmits to the movable die carrier member B an elevated die closing pressure. Auxiliary hydraulic actuator means associated with the hydraulic actuator assembly 52 produce rapid die opening and die closing movements of the movable die carrier member B.

The two die halves 55 and 56 of an injection molding die are mounted on oppositely facing parallel die mounting faces of the movable and stationary die carrier members B and S, respectively. The two die carrier members B and S, as well as the stationary cylinder head plate M are preferably of cast iron.

The four tie rods 42 have their axes arranged at the four corners of a square or rectangle defined by two parallel vertical sides and two parallel horizontal sides, the center point of the rectangle coinciding with the center axis e—e of the die closing unit. Each of the four tie rods 42 has one axial end portion seated in the stationary die carrier member S and the other end portion seated in the stationary cylinder head plate M.

The tie rod end portions are rigidly clamped to the two stationary members S and M of the die closing unit by means of special clamping attachments with include abutment nuts 54 threaded onto the outwardly protruding tie rod end portions. Clamping plates 40 bearing against the extremities of the tie rods 42, under the effect of clamping bolts 41, press the abutment nuts 54 against the stationary members. The threaded bores 34 for the clamping bolts 41 can be seen in FIG. 2.

The stationary die carrier member S, the cylinder head plate M, and the four tie rods 42 thus form a rigid skeleton structure for the die closing unit. This skeleton structure is supported on two guide rails 47 of a box-like machine base 46. The guide rails 47 extend parallel to the center axis e—e of the die closing unit. They are welded onto horizontal edge flange portions of the longitudinal side walls of the machine base 46.

The guide rails 47 have precision-machined horizontal upper faces and vertical inner faces which serve to center and mutually align the stationary die carrier member S, the movable die carrier member B, and the cylinder head plate M of the die closing unit. This configuration of the machine base 46 and its guide rails 47 results in a high degree of rigidity, at least in the sense of suppressing vertical deflections of the guide rails 47.

The stationary die carrier member S is rigidly bolted to the two guide rails 47 by means of a plurality of clamping bolts 38. The stationary cylinder head plate M, while likewise supported on the guide rails 47, engages the latter in such a way that it can execute minute longitudinal displacements along the guide rails, in order to accommodate the elongation which takes place on the four tie rods 42, under the elevated die closing pressure which must be applied to the injection molding die during injection. A preferred way of providing such an engagement between the stationary cylinder head plate M and the guide rails 47 is disclosed in my copending U.S. patent application Ser. No. 443,644, filed Nov. 22, 1982, now U.S. Pat. No. 4,530,655.

The movable die carrier member B, in addition to being guided and supported on the tie rods 42, is preferably also guided and supported on the two guide rails 47 by means of lateral guide shoes 53 engaging its horizontal and vertical guide faces. The guide shoes 53 may be of the sliding type or of the rolling type.

A horizontally oriented injection unit is arranged on the outer side of the stationary die carrier member S, if the injection molding die is designed for injection through the center of the stationary die carrier member S. FIG. 1 shows the end portions of two horizontal supporting rods 44 and two mounting sockets 43 by means of which a horizontal injection unit is clamped to the mounting faces 35 of the stationary die carrier member S.

As can be seen in FIGS. 2 and 3, the main portion of the transversely oriented stationary die carrier member S of the die closing unit is a block-like die carrier body 10 which has a rectangular and preferably square outline, when viewed in the axial direction. This outline is defined by two parallel horizontal rectangle sides ht and two parallel vertical rectangle sides vt. FIG. 3 shows that the seating bores 24 for the four tie rods 42 of the die closing unit are arranged in the corner portions of the rectangular die carrier body 10 in such a way that the horizontal rectangle sides ht and the vertical rectangle sides vt have the same distance from the axes of the tie rods 42.

The movable die carrier member B has a transversely extending die mounting wall 50 of the same rectangular outline as the die carrier body 10, with guide bushings (not shown) in the place of the tie rod seating bores 24 of the stationary die carrier member S. The die mounting wall 50 is part of a frame structure which includes a transversely extending pressure transfer wall 49 which is connected to the die mounting wall 50 by means of a plurality of axially extending pressure transfer ribs 48.

The stationary die carrier member S and the movable die carrier member B are castings of spherolitic cast iron containing spheroidal graphite. The two die carrier members B and S support the movable and stationary halves 55 and 56, respectively, of the injection molding die on machined parallel die mounting faces. FIGS. 3 and 5 show two alternative layouts of the die mounting face of the stationary die carrier member S. Although it is not immediately evident from the drawing, it should be understood that the die mounting face of the movable die carrier member B has preferably the same configuration as the die mounting face of the stationary die carrier member S.

The die mounting face on the inner side of the stationary die carrier member S defines an inner face plane h—h, and a number of jointly machined smaller faces on the outer side thereof define an outer face plane f—f, as can be seen in FIG. 1. The various outer faces include four abutment faces 33 surrounding the tie rod seating bores 24, for cooperation with the abutment nuts 54 of the tie rod attachments, and two mounting faces 35 for the mounting sockets 43 of the injection unit.

As can be seen in FIG. 1, the stationary die carrier member S has two elongated horizontal supporting faces F with which it engages the horizontal upper faces of the two guide rails 47 under the clamping action of the bolts 38. The axial length A of the two supporting faces F, as measured between their supporting edges x and y, is preferably considerably greater than one-half of the vertical distance between the center axis e—e and the supporting faces F.

In the embodiment which is shown in the drawings, the length A of the supporting faces is also close to twice the axial distance a between the two face planes h—h and f—f of the stationary die carrier member S. Because the connection between the stationary die carrier member S and the machine base 46 is of the cantilever-type, its resistance in terms of preventing an axial deflection of the stationary die carrier member S is improved by the proposed increase in the length A of the supporting faces F. The other major factor working against an axial deflection of the stationary die carrier member S is, of course, the rigidity of the die carrier member itself.

The two horizontal supporting faces F of the stationary die carrier member S are located laterally outside its block-shaped die carrier body 10 and arranged on the lower side of horizontal supporting flanges 14 and 16 which adjoin the axially inner and outer sides of a collar-like transverse shield 11 near the outer face plane f—f of the die carrier member. While the inner supporting flanges 14 carry a major portion of the weight hanging on the stationary die carrier member S, the outer supporting flanges 16 serve primarily to reinforce the clamping connection between the stationary die carrier member S and the two guide rails 47 of the machine base 46. Each inner supporting flange 14 has one vertical bore 32 and each outer supporting flange 16 has two vertical bores 32 for the clamping bolts 38.

The inner supporting flanges 14 form angular shapes with vertically extending inner positioning flanges 13, being joined to the latter at the lower extremities of two diagonal struts 12 which extend downwardly and outwardly form the two lower corners of the die carrier body 10. The outer supporting flanges 16 are similarly adjoined by vertically extending outer positioning flanges 17 at the lower extremities of diagonal braces 15. The inner and outer positioning flanges 13 and 17 engage the vertical faces of the two guide rails 47 on the machine base 46, thereby centering the stationary die carrier member S in the lateral sense.

The inner and outer supporting flanges 14 and 16 and the inner and outer positioning flanges 13 and 17 are preferably in the form of integral angular profile portions of the die carrier casting, the outer flange portions having substantially the same cross-sectional shape as the corresponding inner flange portions.

The upper extremities of the diagonal braces 15 adjoin the lower extremities of two tapered vertical reinforcing ribs 18. The latter are located axially opposite the vertical outer edges of the die carrier body 10, as defined by the vertical rectangle sides vt. The reinforcing ribs 18 and the diagonal braces 15, in conjunction with the outer positioning flanges 17, thus provide effective bracing and stiffening formations between the die carrier body 10 and the outer supporting flanges 16.

The outline of the transverse shield 11 is generally rectangular, the shield 11 extending radially outwardly from the die carrier body 10 on all four sides. Four horizontal shield braces 19 serve as stiffening members between the vertical portions of the transverse shield 11 and the die carrier body 10.

The cylinder head plate M has a transverse shield 11' which is similar to the transverse shield 11 of the stationary die carrier member S and diagonal struts 12' with horizontal supporting flanges 14' and vertical positioning flanges 13' which compare to the diagonal struts 12, the inner positioning flanges 13 and the inner supporting flanges 14 of the die carrier member S.

The injection molding die, in order to be insertable into and removable from the die closing unit, is limited in its maximum dimensions—at least in the direction perpendicular to the insertion path—to the opening which is provided between two tie rods 42. Accordingly, for an injection molding die which is to be inserted in the horizontal direction, its height is limited to the vertical spacing between the upper and lower tie rods 42, as can be seen in FIG. 1.

The vertical extent of the die mounting faces on the stationary die carrier member S in the inner face plane h—h is preferably equal to the full height of the die carrier body 10 and its horizontal extent is preferably equal to the full width of the die carrier body 10, as can be seen in FIG. 3. The movable die carrier member B has a die mounting face of matching dimensions, in parallel alignment with the die mounting face of the stationary die carrier member S.

In the die mounting faces of the stationary die carrier member S and of the movable die carrier member B are arranged matching patterns of shallow face grooves 30 and 45, respectively. The side walls and the bottom of the face grooves 30 and 45 are not machined and therefore still covered by the original skin of the die carrier casting.

As can be seen in FIG. 3, the face grooves 30 consist of a set of substantially straight horizontal groove portions 30' and a similar set of vertical groove portions 30" which merge into each other in the center portion of the die mounting face, without intersecting the central opening 23 for the injection unit. In general, all the beginnings and endings of the face grooves 30 are located at the horizontal and vertical rectangle sides ht and vt and oriented perpendicularly thereto.

The axial depth of the all the grooves in the groove pattern is substantially uniform and approximately one-sixth of the width of the grooves. The pattern of face grooves 30 in the die mounting face is so arranged that the grooves do not intersect any of the axial bores and openings in the die carrier body 10. All the bores and openings are preferably completely surrounded by a portion of the machined die mounting face.

The face grooves 30 have the effect of subdividing the overall machined surface of the die mounting face into a series of separate surface islands or surface strips. A groove pattern of this type may occupy approximately one-quarter of the total area of the rectangular die mounting face. Given the generally symmetrical configuration of the two die carriers S and B with respect to at least a vertical longitudinal center plane through the die closing unit, the various horizontal groove portions and vertical groove portions of the face grooves 30 and 45 are likewise arranged in a symmetrical pattern, preferably both in the lateral sense and in the vertical sense.

The casting of the die carrier body 10 has a number of interior cavities which are not shown in the drawing. The molding cores for these cavities have core support openings 29 in the machined die mounting face and core support openings 29' in the raw outer face on the back side of the die carrier body 10. These interior cavities are preferably so arranged that they match the pattern of the face grooves 30 in the die mounting face to such an extent that at least one horizontal or vertical groove portion is located in alignment with each interior cavity.

In addition to the core support openings 29 and the earlier-mentioned tie rod seating bores 24 for the tie rods 42, which are surrounded by annular portions of the machined die mounting face, the die carrier body 10 has four axial plunger guide bores 25 which are intersected by four mounting bores 26. The latter serve for the mounting of hydraulic cylinder assemblies (not shown) which control clamping plungers (not shown) in the plunger guide bores 25.

Between the mounting bores 26 on the upper side of the die carrier body 10 are further arranged two mounting faces 28 for the mounting of special insertion and removal devices (likewise not shown). A number of threaded bores 31 for the optional engagement by die clamping bolts are arranged in the machined areas of the die mounting face. The lifting nose 39 on the side of the die carrier body 10 serves for the transport of the die carrier in the machining and assembly operations. The cylinder head plate M has a similar lifting nose 39' on the side of its plate body 10'.

The axially outer side of the transverse shield 11 of the stationary die carrier member S is flush with the raw surface area on the outer side of the die carrier body 10 and hence recessed from the machined abutment faces 33 and mounting faces 35 in the outer face plane f—f. The depth of this recess is preferably the same as the depth of the face grooves 30 on the inner side of the die carrier body 10.

The fact that one-quarter of the area of the die mounting face is recessed from the inner face plane h—h of the die carrier body 10 and therefore not in contact with the attached stationary die half 56 means that the heat transfer between the injection molding die and the stationary die carrier member S is correspondingly reduced. This represents a further advantage in the sense that the die closing unit is better insulated against the hot injection molding die.

The reduction of the size of the total surface area to be machined, and the interruption of this area by a pattern of face grooves, also means that the machining operation itself requires less machining energy and lower cutting pressures. The latter fact is particularly advantageous in connection with a high-speed milling operation of the type which is advantageously employed in the machining of the two die carrier members S and B.

The modified embodiment of the stationary die carrier member S which is shown in FIGS. 4 and 5 differs from the previously described embodiment shown in FIGS. 2 and 3, inasmuch as it has a different layout of the face grooves 30. In the modified groove pattern, the horizontal groove portions 30' do not merge with the vertical groove portions 30" in the central area of the die carrier body 10. Instead, they simply stop short of the opening 23 in the center of the die mounting face, leaving an unbroken surface area around the central opening 23.

The portion of the total surface area of the die mounting face occupied by the face grooves 30 in FIG. 5 is substantially the same as in the case of the face grooves 30 in FIG. 3, and all other features of the stationary die carrier member S are shown to be the same as in the first-described embodiment shown in FIG. 3. The two groove pattern have as a common feature that, along the horizontal and vertical centerlines of the die mounting faces, continuous machined surface areas of the die mounting face extend from the edge of the central opening 23 to the outer edges of the die carrier body 10 in the form of a cross.

The manufacture of the stationary and movable die carrier members S and B, respectively, involves the following essential method steps: The model and the mold for the raw casting from which the die carrier member is to be produced correspond substantially to the final shape of the die carrier member, with the exception that an additional material thickness is provided in those surface areas which lie between the face grooves 30 and 45 and the surface areas which surround the axial openings of the stationary die carrier member S on the inner face plane h—h and the outer face plane f—f, including the mounting faces 35. An additional thickness is also provided on the horizontal supporting faces F of the inner and outer supporting flange 14 and 16, respectively, and on the vertical outer faces of the inner and outer positioning flanges 13 and 17, respectively.

The raw die carrier casting is first cleaned in a sand-blasting operation and than completely covered with a layer of plastic material in a lacquering or powder-spraying operation, for example. The casting is thereupon clamped onto the work table of a machining center, where the inner and outer sides of the die carrier are machined to the inner face plane h—h and to the outer face plane f—f, thereby producing a die mounting face on the inner side and four abutment faces 33 and two mounting faces 35 on the outer side.

The faces on both sides of the die carrier member are machined in a high-speed milling operation. The same machining center is also used to machine the four tie rod seating bores 24, the four plunger guide bores 25, the four mounting bores 26, the faces on the flange portions 13 through 17, and whatever other faces or bores require accurately machined surfaces. During the entire sequence of machining operations, the die carrier member remains preferably in the same clamping position on the machining center.

It should be understood, of course, that the foregoing disclosure describes only a preferred embodiment of the invention and that it is intended to cover all changes and modifications of this example of the invention which fall within the scope of the appended claims.

I claim the following:

1. A die closing unit for an injection molding machine comprising a stationary die carrier member and a movable die carrier member, hydraulic actuator means driving the movable die carrier member to execute die opening and closing movements in relation to a stationary die carrier member along a longitudinal center axis of the die closing unit and producing an elevated die closing pressure, and four parallel tie rods engaged in aligned tie rod bores of the two die carrier members, the tie rods guiding the movable die carrier member in said movements, the two die carrier members having oppositely facing parallel die mounting faces to which the stationary and movable die halves of an injection molding die are attachable, said die mounting faces extending perpendicularly to said center axis and having substantially identical rectangular outlines, in the four corner areas of which are located the tie rod bores; the improvement therein, having for its purpose to enhance the dimensional stability and rigidity of the die closing unit, being characterized in that:

at least one of the two die carrier members is in the form of a rectangular plate of cast iron having two parallel opposite plate faces, one of which is machined to serve as the die mounting face of the die carrier member;

the cast iron is of a type which forms a casting skin the tensile strength of which is considerably greater than the strength of the cast iron below said skin;

the machined die mounting face includes substantially continuous narrow machined surface portions surrounding the four tie rod bores, the remainder of the surface area of the rectangular plate defines a pattern of shallow face grooves the bottom surface of which is parallel to the mounting face and not machined, so as to retain its casting skin; and the face grooves in said pattern are oriented parallel to the sides of the rectangle and spaced apart, so as to alternate with band-like machined surface portions of substantially the same width as the face grooves, the casting skin in the face grooves thereby serving to stabilize and stiffen the carrier member.

2. A die closing unit as defined in claim 1, wherein the width of the face grooves is at least six times larger than their depth.

3. A die closing unit as defined in claim 1, wherein the casting skin in the face grooves is sand-blasted and covered with a layer of protective plastic.

4. A die closing unit as defined in claim 1, wherein the pattern of face grooves is symmetrical with respect to at least one major axis of the rectangle defined by the outline of the die mounting face.

5. A die closing unit as defined in claim 1, wherein the pattern of face grooves in the die mounting face of said die carrier member includes two sets of face grooves oriented at right angles to each other; and the face grooves have outer extremities at the edges of the die carrier member, extending inwardly from said edges at right angles thereto and without intersecting each other.

6. A die closing unit as defined in claim 1, wherein and each die carrier member has a central longitudinal opening through which an attached die half is accessible; and the machined die mounting face includes a substantially continuous band-like machined surface portion surrounding said central opening.

7. A die closing unit as defined in claim 6 wherein the pattern of face grooves in the die mounting face of said die carrier member includes two sets of face grooves oriented at right angles to each other;

the face grooves have outer extremities at the edges of the die carrier member, extending inwardly from said edges at right angles thereto; and face grooves of one set of grooves adjoin face grooves of the other set of grooves at the periphery of said machined surface portion which surrounds the central opening.

8. A die closing unit as defined in claim 6, wherein the pattern of face grooves in the die mounting face of said die carrier member includes two sets of face grooves oriented at right angles to each other;

the face grooves have outer extremities at the edges of the die carrier member, extending inwardly from said edges at right angles thereto; and face groove of both sets of grooves have inner extremities at the periphery of said machined surface portion which surrounds the central opening.

9. A die closing unit as defined in claim 1, wherein said die carrier member with the face grooves in the die mounting face is the stationary die carrier member; and the stationary die carrier member further includes, in substantial alignment with the plate face opposite its die mounting face, a reinforcing shield surrounding at least three sides of the rectangular die carrier member.

10. A die closing unit as defined in claim 9, wherein both the stationary and the movable die carrier members have face grooves in their die mounting faces.

11. A die closing unit as defined in claim 9, wherein the die closing unit is oriented so that its four tie rods extend in two vertically spaced horizontal plains, the die closing unit being adapted for mounting on a machine base which has two horizontal mounting rails arranged in parallel alignment with said tie rods, the mounting rails being located below and laterally outside the lower two of the four tie rods;

the stationary die carrier member further includes two diagonal struts reaching downwardly and laterally outwardly from the lower corners of the die carrier member, the two diagonal struts terminating in mounting flanges which are adapted to be clamped to the mounting rails of the machine base, with the result that the stationary die carrier member extends upwardly from the mounting rails in a cantilever fashion; and said reinforcing shield adjoins the diagonal struts and the mounting flanges of the stationary die carrier member in the manner of a peripheral reinforcing collar.

12. A die closing unit as defined in claim 11, wherein said flanges of the stationary die carrier member extend in the horizontal longitudinal direction from a point coin ciding approximately with the plane of the die mounting face to a point which is located a distance beyond said reinforcing shield, so as to produce a rigid cantilever attachment between the stationary die carrier member and the mounting rails of the machine base.

13. A die closing unit as defined in claim 12, wherein
the two diagonal struts have the same horizontal longitudinal dimension as the mounting flanges, so that portions of said struts are likewise located longitudinally beyond the reinforcing shield; and the strut portions located beyond the reinforcing shield are adjoined by tapered reinforcing ribs protruding from the reinforcing shield.

14. A die closing unit as defined in claim 9, wherein
the reinforcing shield surrounds said at least three sides of the die carrier member in the manner of a radial collar; and the reinforcing shield is braced against the periphery of the rectangular die carrier member by means of shield braces in the form of ribs.

* * * * *